(12) United States Patent
Hendricks et al.

(10) Patent No.: US 10,589,384 B2
(45) Date of Patent: Mar. 17, 2020

(54) PROCESSING OF MATERIAL USING NON-CIRCULAR LASER BEAMS

(71) Applicant: HIGH Q LASER GMBH, Rankweil (AT)

(72) Inventors: Frank Hendricks, Satteins (AT); Victor Matylitsky, Lindau (DE)

(73) Assignee: HIGH Q LASER GMBH, Rankweil (AT)

( * ) Notice: Subject to any disclaimer, the term of this patent is extended or adjusted under 35 U.S.C. 154(b) by 0 days.

(21) Appl. No.: 15/317,220

(22) PCT Filed: Jul. 8, 2015

(86) PCT No.: PCT/EP2015/065615
§ 371 (c)(1),
(2) Date: Dec. 8, 2016

(87) PCT Pub. No.: WO2016/005455
PCT Pub. Date: Jan. 14, 2016

(65) Prior Publication Data
US 2017/0120374 A1   May 4, 2017

(30) Foreign Application Priority Data
Jul. 9, 2014   (EP) ..................................... 14176292

(51) Int. Cl.
*B23K 26/02* (2014.01)
*B23K 26/40* (2014.01)
(Continued)

(52) U.S. Cl.
CPC .......... *B23K 26/53* (2015.10); *B23K 26/0006* (2013.01); *B23K 26/0624* (2015.10);
(Continued)

(58) Field of Classification Search
CPC ............ B23K 26/02; B23K 26/36–389; B23K 26/40–402; C03B 33/02; C03B 33/09–093; C03B 33/08–082
See application file for complete search history.

(56) References Cited

U.S. PATENT DOCUMENTS

| 6,574,250 B2 | 6/2003 | Sun et al. |
| 8,817,373 B2 * | 8/2014 | Kobayashi ........... G02B 5/3025 |
| | | 359/487.01 |

(Continued)

FOREIGN PATENT DOCUMENTS

| CN | 104339084 A | 2/2011 |
| DE | 102012110971 A1 | 5/2014 |

(Continued)

OTHER PUBLICATIONS

IPRP and Written Opinion of the International Search Authority PCT/EP2015/065615 dated Jan. 10, 2017.
(Continued)

*Primary Examiner* — Michael A Laflame, Jr.
(74) *Attorney, Agent, or Firm* — David A. Jones; Alpine IP PLLC

(57) ABSTRACT

Method for processing of material by use of a pulsed laser Each laser pulse is shaped regarding its beam profile so that a cross sectional area, which is defined by a cross section of the laser pulse in its focal point orthogonal to its propagation direction, is of particular shape and has a main extension axis of greater extent than its minor extension axis. One major crack is effected by each laser pulse, the major crack having a lateral extension basically oriented according to the main extension axis of the respective pulse in the focal point. Furthermore, each laser pulse is emitted so that the orientation of its main extension axis in the focal point corresponds to a pre-defined orientation relative to an orientation of a respective tangent to the processing path at the assigned processing point.

15 Claims, 9 Drawing Sheets

(51) Int. Cl.

| | | |
|---|---|---|
| *B23K 26/53* | (2014.01) | |
| *B23K 26/00* | (2014.01) | |
| *B23K 26/073* | (2006.01) | |
| *C03B 33/02* | (2006.01) | |
| *B23K 26/0622* | (2014.01) | |
| *C03B 33/04* | (2006.01) | |
| *B23K 26/06* | (2014.01) | |
| *B23K 26/38* | (2014.01) | |
| *B23K 103/00* | (2006.01) | |

(52) U.S. Cl.
CPC ...... *B23K 26/0626* (2013.01); *B23K 26/0736* (2013.01); *B23K 26/38* (2013.01); *B23K 26/40* (2013.01); *C03B 33/0222* (2013.01); *C03B 33/04* (2013.01); *B23K 2103/50* (2018.08); *B23K 2103/56* (2018.08); *Y02P 40/57* (2015.11)

(56) References Cited

U.S. PATENT DOCUMENTS

| | | |
|---|---|---|
| 2004/0002199 A1 | 1/2004 | Fukuyo et al. |
| 2006/0145399 A1 | 7/2006 | Weisser et al. |
| 2007/0272668 A1* | 11/2007 | Albelo ................ B23K 26/386 219/121.72 |
| 2012/0111310 A1 | 5/2012 | Ryu et al. |
| 2012/0223061 A1 | 9/2012 | Atsumi et al. |
| 2012/0312793 A1 | 12/2012 | Nomaru |
| 2012/0322240 A1* | 12/2012 | Holden ............. H01L 21/30655 438/462 |
| 2016/0031745 A1* | 2/2016 | Ortner ................ B23K 26/0057 65/29.1 |

FOREIGN PATENT DOCUMENTS

| | | |
|---|---|---|
| JP | 2013082589 A | 5/2013 |
| JP | 2014104484 A | 6/2014 |
| WO | 01/51243 A2 | 7/2001 |
| WO | 0222301 A1 | 3/2002 |
| WO | 2012/006736 A2 | 1/2012 |

OTHER PUBLICATIONS

D. Helie; R. Vallee, "Micromashining of Thin Glass Plates with a Femtosecond Laser", Proc. Of Spie, (2009), vol. 7386, 738639.
F. Ahmed; M.S. Lee; H. Sekita, "Display Glass Cutting by Femtosecond Laser induced single shot periodic void array", Appl. Phys. A, (2008), vol. 93, pp. 189-192.

* cited by examiner

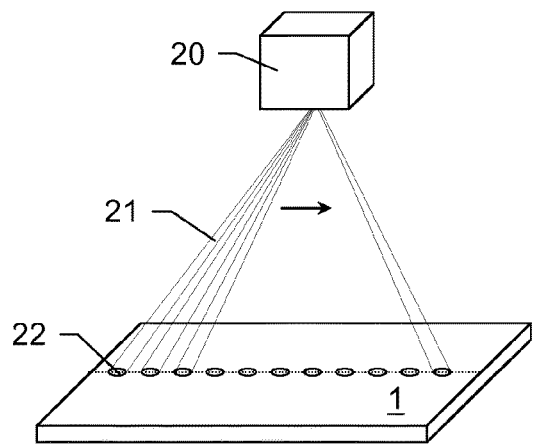
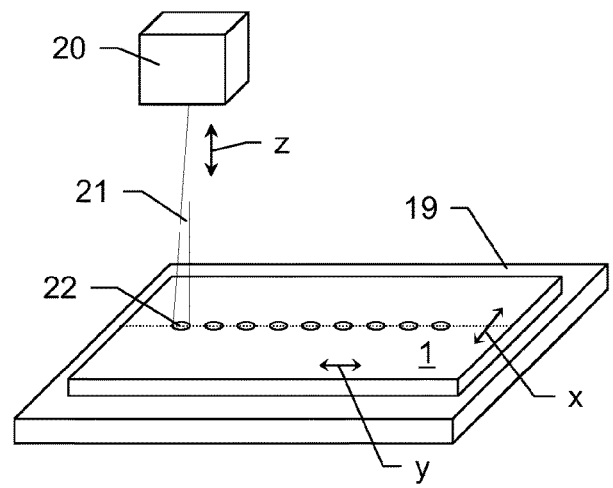
Fig. 3a                  Fig. 3b
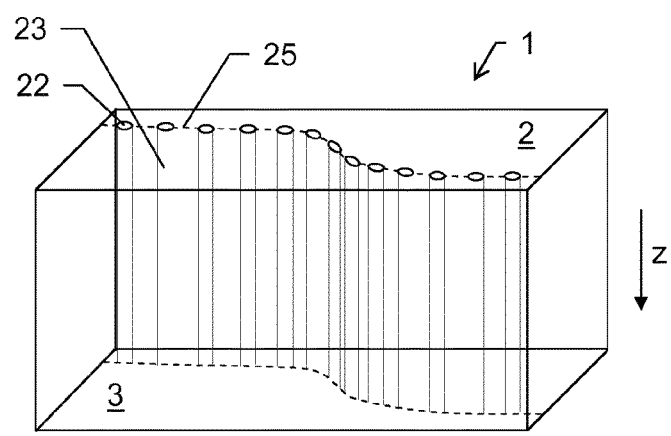
Fig. 4a

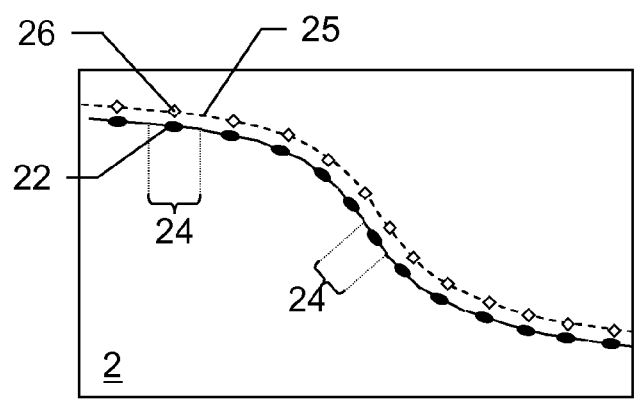
Fig. 4b
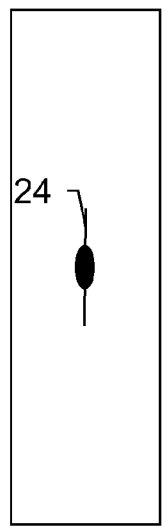 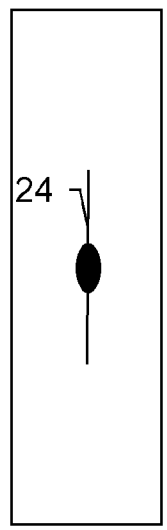 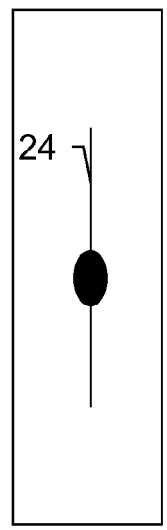 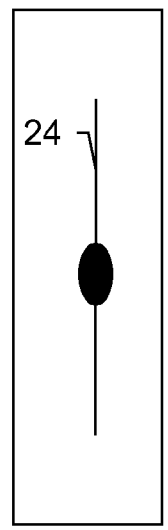 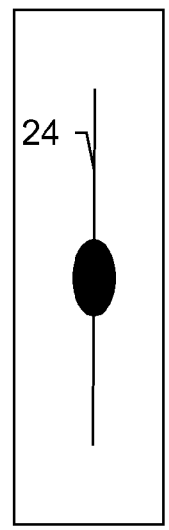
Fig. 5a    Fig. 5b    Fig. 5c    Fig. 5d    Fig. 5e

PROCESSING OF MATERIAL USING NON-CIRCULAR LASER BEAMS

FIELD OF THE INVENTION

The present invention generally pertains to a method for processing of material by use of a pulsed laser, wherein micro-cracks with defined orientation are effected in the material by applying laser beam pulses with a spatial distribution of laser power across its beam cross section having greater spatial extent in a first direction relative to an orthogonal second direction so that precise cutting of the material along a designated processing path is enabled with high speed.

BACKGROUND

Established mechanical methods for machining of fragile materials such as saw cutting and scribing often cannot satisfy the industrial needs or requires extensive post processing to meet the needs in terms of quality and throughput. Nowadays, lasers are increasingly used for machining of different types of materials. Laser cutting processes such as melting, vaporization and fusion cutting are used for cutting of ductile materials like metals and polymers. These methods are not appropriate for cutting of transparent or semi-transparent materials to meet required high quality and cutting speed standards.

As for instance known from D. Helie and R. Vallee, "*Micromashining of Thin Glass Plates with a Femtosecond Laser*", Proc. of SPIE Vol. 7386, 738639, Photonics North 2009, for such cutting of transparent materials a controlled fracture technique is a well suitable method for machining of those materials.

When curvilinear and close shaped internal features are needed to be cut a laser direct ablation process can be used. However, the ablation rate, i.e. the processing speed of the direct ablation method, is scaled with the laser average power and normally limited to several mm/s. Besides of slow processing speed the formation of cracks, contamination by ablation debris, collateral damages along cut (heat affected zone) are typical disadvantages of the laser direct ablation processes.

Application of femtosecond laser filamentation for machining of glass substrate is an interesting alternative to the direct ablation process. An idea of fast cutting of a display glass where the sample is pre-processed using femtosecond laser pulses prior to glass cleaving was proposed by Ahmed et al. (F. Ahmed, M. S. Lee, H. Sekita, "*Display Glass Cutting by Femtosecond Laser induced single shot periodic void array*", Appl. Phys. A (2008) 93, 189-192). The maximum processing speed achieved in this study was 15 mm/s. The speed has been limited by the minimum distance between voids, because it was not possible to cleave the sample when void period was larger than 10 µm.

The stress build-up and micro-defects induced by filamentation are known for being used for cutting of thin borosilicate glass substrate and for production of simple 3D parts from different types of glass. However, controlling of the generated cutting edge cannot be realised by this technique, hence the application of above proposed methods for cutting of curvilinear and internal features is not feasible.

Therefore, it is an object of the present invention to provide an improved processing method for (e.g. transparent or semi-transparent) materials, wherein a more precise processing of the material, particularly in terms of quality of a cutting edge, along a desired processing path with higher processing speed (e.g. >15 mm/s) is enabled.

A further object of the invention is to provide a laser cutting method which enables to cut curvilinear or other shape contours in a transparent or semi-transparent material with high precision and speed.

SUMMARY

The invention relates in one aspect to cutting plates, wafers and/or substrate using formation and controlling of micro defects orientation inside of a transparent material. This can be used for the straight cut as well as for producing of the curvilinear and/or internal closed shape features in the material.

The invention generally relates to a method for processing of in particular transparent or semi-transparent (with respect to a wavelength of the pulsed laser) material by use of a pulsed laser.

The method comprises generating a series of (ultra-short) laser pulses, in particular laser pulses with pulse durations of <1 ns, in particular picosecond laser pulses, in particular femtosecond laser pulses, and directing each laser pulse to the material with defined reference to a respectively assigned processing point of a processing path. Each laser pulse is focussed so that respective focal points of the focussed laser pulses comprise pre-defined spatial relations to a first surface of the material (in particular regarding a z-axis corresponding to a thickness of the material). For instance, each laser pulse is focussed so that respective focal points of the focussed laser pulses lie on a first surface of the material or between the first and an opposite second surface of the material or on the opposite second surface of the material. Each emitted laser pulse causes a respective micro-crack within the (in particular fragile) material.

The main physical effect, which allows coupling of laser energy into transparent or semi-transparent material, is nonlinear absorption. Nonlinear absorption allows confinement of the laser energy inside of the material. Application of ultra-short laser pulses makes the nonlinear processes in material such as nonlinear absorption and self-focusing etc. more likely.

Accordingly, for processing of transparent or semi-transparent material, the respective wavelengths of the emitted laser pulses correspond to a wavelength-transparent or wavelength-semi-transparent range of the material to be processed. In other words, the wavelength of the emitted laser light is adapted according to the transparency or semi-transparency of the material. Typically, the laser pulses are emitted with one common wavelength, e.g. in the near-infrared region for processing of glass.

FIG. 1 shows a typical defect inside of a glass material 100 induced by application of one femtosecond laser pulse at 1040 nm as known from prior art. The used laser beam here comprises a fully symmetrical circular beam profile. Due to that circular profile the occurring defects consist of a set of radiant cracks 102 around the generated channel 101. The maximum size of such cracks typically is of about 10 µm length. Since controlling the type and the shape of the micro defect inside of glass can not be realised by applying a circular beam profile the inventive method is based on an alternative approach.

According to one general aspect of the invention, each laser pulse is shaped regarding its beam profile so that a cross sectional area, which is defined by a cross section of the laser pulse orthogonal to its propagation direction in the focal point, is of particular shape and has a main extension axis of significantly greater extent than a minor extension axis, in particular wherein the minor extension axis is orthogonal to the main extension axis (i.e. the beam profile is non-circular). Moreover, one major micro-crack is effected by each laser pulse, the major micro-crack having a lateral extension basically oriented according to the direction of the main extension axis of the cross sectional area of the respective pulse in the focal point. Additionally, each laser pulse is emitted so that the orientation of its main extension axis in the focal point corresponds to a pre-defined orientation relative to an orientation of a respective tangent to the processing path at the particular processing point. Such approach may be combined with any other specification of the method described herein, e.g. with use of a compensation plate or a multi foci lens (see below). Each of those approaches provides a particular solution to the common problem of efficient and high-quality laser processing of material, preferably glass, using a non-circular laser beam.

According to another general aspect of the invention, each laser pulse is shaped regarding its beam profile so that a cross sectional area, which is defined by a cross section of the laser pulse orthogonal to its propagation direction in the focal point, is of particular shape and has a main extension axis of significantly greater extent than a minor extension axis, in particular wherein the minor extension axis is orthogonal to the main extension axis (i.e. the beam profile is non-circular with a preferred (main) extension axis). Moreover, one major micro-crack is effected by each laser pulse, the major micro-crack having a lateral extension basically oriented according to the direction of the main extension axis of the cross sectional area of the respective pulse in the focal point and the lateral extent of the major micro-crack is significantly greater than the extent of the respective main extension axis of the cross sectional areas in the focal point, the lateral extent is in a range of 3-30 times the length of the respective main extension axis. Additionally, each laser pulse is emitted (irradiated on the material) so that the orientation of its main extension axis in the focal point corresponds to a pre-defined orientation relative to an orientation of a respective tangent to the processing path at the particular processing point.

In context of the present invention, the cross sectional area particularly is defined by a distance to the centre of the laser beam which corresponds to a decrease of the laser peak power to an half (full width half maximum, FWHM) or to $1/e^2$ of that power (Gaussian beam profile). Typically, the reference (½ or $1/e^2$) only influences the size but not the shape (ellipticity) of the cross section. Regarding the shape of the laser beam (i.e. of the beam profile of the laser pulse) which effects the desired micro-crack in the material, the cross sectional area as defined above is related to a corresponding cross section through the laser beam in the focal point or the focal plane, respectively.

In particular, one single laser pulse of the series of laser pulses comprises a pulse energy of at least 10 μJ, particularly more than 30 or 40 μJ, and is a femtosecond laser pulse or at least a pulse with a duration shorter than 10 ps which results in the lateral extent of the major micro-crack being significantly greater than the extent of the respective main extension axis of the laser pulse cross section.

Cutting in sense of processing a material, e.g. a glass or sapphire substrate, according to the invention, may preferably be performed using following parameters of a respective laser system (assuming that cutting can be achieved by a single line scan): a pulse energy of about 34 μJ, a repetition rate of up to 200 kHz and an average power of 6.8 W.

Moreover, the laser beam is spatially shaped to a collimated elliptical beam shape, wherein the intensity profile is Gaussian in both axes with a major spot diameter around 2.18 times bigger than minor spot diameter. As a result major micro-cracks having a lateral extend of 3-30 times the length of the respective main extension axis are caused. The sample may preferably be moved with respect to a focal spot at a speed of up to 6 m/s.

It is to be understood that the beam profile not necessarily has to be of a "Gaussian" profile but may alternatively be a "Top-Hat" or "Donut" profile or any other beam profile providing for suitable non-circularity of the cross sectional area.

Furthermore, in context of the present invention, (full) symmetry of the cross sectional area is understood to be rotationally symmetrical in continuous manner (i.e. independent from a grade of rotation), wherein asymmetry is understood to also be rotational symmetric but only in discrete manner (e.g. by each 180° of rotation) which corresponds to an embodiment of the beam profile of the laser pulses. For instance, in sense of the present application, a circle is assumed to be symmetrical, wherein an ellipse having a main extension axis (major axis) being of significantly greater extent than its minor axis is assumed to be in a way asymmetrical (=not fully symmetrical). Moreover, a symmetric body is to be understood as being axisymmetric with respect to any axis intersecting the geometric centre, wherein a body should be assumed asymmetric as soon as symmetry according to one of such axis is not given. Of course, asymmetric shapes not necessarily have to provide any symmetry.

By above processing method a controlled manipulation of the material is provided by generating micro-defects (micro-cracks) in the material in a defined manner in terms of formation and orientation of the effected defects. Due to the laser beam providing a main extension axis as mentioned (instead of a symmetric, circular beam) very well defined single major micro-cracks (micro-defects) are obtained (instead of an arbitrary number of radiant cracks). There only emerges one single major micro-crack per initially impinging pulse.

Of course, there may additionally be effected significantly smaller minor cracks (by interaction of the emitted laser pulse with the material to be processed) the extension axis of which differs from that of the major crack, but as these minor cracks due to their essentially smaller sizes do not contribute to a desired processing of the material, they are considered negligible in context of the present invention.

Regarding the shape of the cross sectional area of the laser beam, the laser pulses are shaped so that a defined main extension direction is given by the cross sectional area. Thus, the pulses may have kind of elongated shapes like a stripe, particularly a line with little extension relative to the direction of the line, or like a rectangle (wherein—of course—the longer sides of the rectangle define the main extension axis) or like an ellipse with a major axis and a minor axis as described herein below. Furthermore, the cross sectional area may be of any alternative (non geometric) shape which provides one single main elongation direction (axis).

As the pulse is directed to the surface so that the orientation of the main extension axis is correlated with the orientation of a tangent on the processing path, each major micro-crack effected (caused) thereby also correlates as to its orientation to the orientation of a tangent to the processing path, particularly at the respective processing point.

The processing path, to which the method according to the invention basically (but not exclusively) is related, is embodied as a curvilinear (curved) processing path.

Moreover, a major micro-crack which is generated by emitting an elongated laser pulse with a greater main extension axis at a transparent or semi-transparent material has—compared to a micro-crack induced by a circular pulse with basically same pulse energy—an increased length.

Furthermore, in contrast to filamentation approaches known from prior art, a major crack effected by the present method is of significantly greater lateral size than a major axis of its cross sectional area. Filamentation aims to generating accurate channels of diameters in the region of the size of the beam cross section throughout the entire material (in z-direction), wherein the major cracks to be effected in context of the present invention are desired and effected with notable greater lateral extension compared to the beam diameter.

According to the invention, the respective major micro-cracks are effected with lateral lengths significantly larger than the length of the respective main extension axis of the cross sectional areas in the focal point. The lateral length relates to a length of the respective major micro-cracks in a direction basically parallel to a focal plane. As mentioned, the lateral lengths are in a range of 3-30 times the length of the respective major axes of the laser beam, i.e. the lateral length is greater than the extension of the area modified by the laser (where the laser pulse hits the material).

As a consequence, the distance at/in the material between two successive laser pulses can be chosen to be correspondingly large and still provide a cutting (processing) path without any processing interruptions (related to lateral processing direction e.g. in the focal plane).

Since the distance between the two successive pulses can be chosen large, the corresponding cutting speed can significantly be increased. Cutting speed is defined as a velocity of laterally moving the laser beam relative to the substrate to be processed, which mathematically is defined as a product of the distance between two successive pulses at the substrate and the repetition frequency the laser pulses are emitted with.

In particular, the distance between two successively emitted pulses directed to the material is chosen to be greater than the length of one major micro-crack caused by such laser pulse. Thereby, cutting quality according to given requirements can still be reached with even faster cutting speed.

In addition, due to larger distance between two modification areas, i.e. between laser pulses interacting with the substrate, overall roughness of a cross-section in z-direction through the material to be processed and along the processing path with much better quality (lower roughness) can be realised. Roughness of glass to be processed is much lower in areas not being modified with a laser. Thus, with increasing distance between laser pulses areas of no-modification are enlarged as well and roughness decreases accordingly.

In particular, on emitting the laser pulses, a distance between the laser system (i.e. a point where the laser beam is emitted by the laser system) and the first surface of the material, which faces the laser system, corresponds to less than or equal to the focal length of the laser beam and a distance between the laser system and the second surface, which second surface is turned away from the laser system, corresponds to more than or equal to the focal length of the laser beam, for providing a well focussed beam e.g. in a defined focal plane.

Alternatively, the laser pulses are focussed and emitted so that the focal points of the emitted laser pulses lie in different planes within the material. That approach allows processing of e.g. specifically shaped material or of material which comprises defined structures.

In other words, the laser pulses can be focussed so that at least two focal planes are defined in the material and respective focal points of the focussed laser pulses lie in the two focal planes, or—while directing the laser pulses to the material—variable focussing can be performed with changing a focal length using a variable-focus lens to achieve variable focusing spots in z-direction. The variable-focus lens enables to provide different focal lengths along an emission direction of the laser beam on demand, for instance by changing the optical properties of the lens the focal length changes as well.

Furthermore, static focussing can be performed with simultaneously providing at least two focal lengths using one single multi-foci lens. The optics of such multi-foci lens defines at least two focal points of different focal length at the same time.

Above approaches of varying the focal length for successive pulses or providing at least two focal points at once enable to increase processing speed in cases when cracks in at least two planes are to be induced, such planes particularly being parallel to the first surface of the substrate.

Alternatively, the laser beam is focussed so that the focal point lies above but still near the first surface or below but still near the second surface.

The laser pulses may preferably be ultra-short laser pulses with pulse durations of <1 ns, particularly <10 ps or in the femtosecond region.

In context of the present invention, the material to be processed in particular is in form of a transparent material, particularly glass or sapphire, particularly strengthened glass.

The above effects and properties provide the further advantage that a lateral propagation of a crack in the material can be controlled and defined with respect to its direction by applying successive laser pulses with defined lateral distance and defined orientation relative to each other. The induced crack propagates basically according to the orientation of a projection of the main extension axis of the elongated cross sectional area in the focal point of a following laser pulse, i.e. in case the laser pulse impinges orthogonally on the surface (the propagation direction of the laser beam is orthogonal to the surface of the material), the crack propagates basically according to the orientation of the main extension axis of the cross sectional area (e.g. of the elliptical beam profile).

In addition, the inventive method of controlled formation and controlled orientation of micro-defects inside materials offers the advantage over other laser processing methods, particularly cutting, that cutting can be performed with significant higher speed. This is achieved because the distance between voids used for cutting are defined by the size of micro-defects. As these defects are created with greater lengths, fewer pulses have to be emitted for cutting and thus the cutting speed can be increased correspondingly.

Furthermore, the method according to the invention provides for precise cutting of a curvilinear contour and of internal closed shape features in transparent or semi-transparent (with respect to the wavelength) material.

Additionally, a high quality cut is provided, wherein no chipping and no debris along the cutting edge occur, and a processing without or with very small kerf losses is provided. Particularly, no or very less micro-defects are left inside of material after cleaving.

The above method of laser processing may preferably be realised with a laser system for generating ultra-short laser pulses, i.e. pulses with pulse durations in the femto- or picosecond order, wherein the system has to be embodied in specific manner for performing the method. The system in general may comprise a mode-locked laser generator with e.g. a ytterbium- or neodymium-doped laser medium like ytterbium doped wolframate (e.g. Yb:KYW or Yb:KGW) or neodymium doped vanadate (e.g. Nd:YVO$_4$). Systems of such general configuration are well known for applications of material processing.

According to an embodiment of the invention, the orientation of the main extension axis of the cross sectional area of each laser pulse is adapted depending on the course of the processing path by a defined rotation of the beam profile. The beam profile is particularly rotated around the centroid of the cross sectional area. Such rotatability of the beam profile provides material processing according also to curvilinear paths, wherein upon a change of the path direction the orientation of the beam profile is adapted accordingly so that applied pulses remain oriented in defined relation to respective tangents (concerning their main extension axes) to the processing path.

By that, a possibility to control crack propagation is given using an elongated, non-circular (e.g. elliptical or stripe like shaped) beam. For instance, an elliptical beam is rotated by 15° per step in order to provide processing along a curvilinear path with respective curvature. A change of the orientation of the elliptical beam relatively to the sample to be processed leads to a change in the orientation of the effected micro-cracks inside of the sample, e.g. glass sample. As mentioned above, the direction of micro-crack propagation basically coincides with the direction of the ellipse major axis in the focal point between the surfaces of the material.

The change of the orientation of the cross section for the laser pulses, i.e. of the beam profiles, for instance is realised by a specific variable arrangement of optical or electro-optical elements (e.g. mirror, prism etc.) and/or by specific adaptations concerning the coupling the laser beam out of the laser system. Such adaptation of the orientation may be provided by a beam defining unit.

Concerning orienting the main extension axes of the emitted laser pulses, with view to amorphous material like glass, it generally is regardless of how the pulses are oriented relative to the material (as there is no defined structure within the material) for providing a suitable processing of the material. However, as to processing and specifically cutting of crystalline material the orientation of the main axis of the first pulse(s) applied to the material may significantly influence the processing, in particular influences the way of fracturing of the material with respect to laser cutting. In order to provide precise cutting of crystalline structured material, the orientation of the main extension axis of the first emitted pulse is to be set in such manner that the orientation of such main extension axis corresponds to the crystalline structure of the material (i.e. corresponds to an orientation of the crystals in the material). For that, the processing path and/or the orientation of the crystalline material to be processed relative to the laser system may be adapted accordingly.

With respect to orienting each laser pulse according to the processing path, each laser pulse can be emitted with a pre-defined orientation of its main extension axis which (pre-defined orientation) corresponds to an angular deviation from the orientation of the respective tangent (at the processing point) of up to 20°, particularly up to 10°.

By setting a defined rotational angular deviation from the respective tangent to the processing path, the propagation of a continuous crack in the material can be controlled concerning particular materials like glass (e.g. in case the effected major micro-cracks are not adjoining, but there is a defined gap between the major micro-cracks), i.e. the propagation of the crack (fracture of the material) occurs after a defined time interval after laser processing. For such materials, the crack-propagation is dependent on the described angular deviation. That effect and its controlling can be advantageous with view to cutting of such material, wherein the material initially bursts after completion of an entire processing step.

Thus, a pre-defined time-delay with respect to crack-propagation in the material can be adjusted by correspondingly setting the angular deviation of the orientation of the main extension axis of the laser pulses relative to the respectively assigned tangent.

Concerning the locations at which the laser pulses impinge on the surface of the material, the pulses are placed in well defined manner.

According to a specific embodiment of the invention, the laser pulses are emitted so that a lateral distance on the surface or in a plane relative to the first surface and/or with reference to the focal points between at least two of the laser pulses, which are successively emitted, corresponds to an average of the lateral lengths of the major micro-cracks caused thereby.

Thus, in above context, as the length of the effected major micro-crack by one laser pulse corresponds to 3-30 times the distance (in the focal plane) from the beam centre to a point along the main extension axis of the cross section at which the power of the laser e.g. is $1/e^2$ of the peak power and the distance between two of such pulses basically is the average of the lengths of the effected major micro-cracks, the effected major micro-cracks are touching each other (are adjoining). With other words, as an example, the length of the main extension axis of a pulse in the focal point is in the range of 2-3 μm and the effected major micro-crack has a lateral (parallel to the first surfaces of the material and/or to the focal plane) length in the rage of 10-60 μm, the laser pulses are applied with a distance between each others corresponding to a respective value of the rage of 10-60 μm.

Preferably, the laser pulses are directed so that the effected major micro-cracks are laterally touching or nearly touching each other in order to provide a precise processing or cutting of the material. As the micro-cracks comprise lengths significantly greater than the length of the main axes of the cross sections of respective pulses, the distance between the pulses on the surface is chosen correspondingly bigger.

According to a respective embodiment of the invention, the laser pulses are emitted so that the lateral distance between at least two of the laser pulses (with reference to their focal points or on the first surface, respectively), which are successively emitted, is bigger than the average of the lengths of the main extensions, particularly major axes, of respective cross sectional areas of these pulses in the focal points. By that, respective major micro-cracks are created with a defined spacing in between or respective major micro-cracks are adjoining (basically no distance between the micro-cracks and also basically no overlapping). Furthermore, the major micro-crack effected by a first of the successive laser pulses is extended due to the major micro-crack induced by a second of the successive laser pulses.

In particular, according to the invention, the laser pulses are emitted so that successively emitted laser pulses impinge on the surface with a relative lateral distance as described above. Consequently, (only) one single laser pulse is directed to each respective processing point, wherein a defined distance to a preceding and to a following laser pulse exists.

Preferably, a distance of successive (neighbouring) processing points on the processing path corresponds to a lateral distance as outlined above. Thus, the distance between two processing points may correspond to an average of the lateral lengths of the major micro-cracks which are caused by pulses applied at these points.

According to a preferred embodiment, at least one of the laser pulses is shaped so that its cross sectional area is of elliptical shape (in its focal point) and the main extension axis is defined by (the direction of) the major axis of the elliptical cross sectional area, i.e. the major axis corresponds to the main extension axis.

For effecting the linear major micro-cracks with laser pulses of elliptical pulse profile—according to the invention—the laser beam (a laser pulse respectively) is configured (shaped) so that the relation of the length of the major axis to the length of the minor axis of the (elliptical) cross sectional area is at least 1.1:1 or 1.2:1.

Glass cutting according to the method of the invention for example shows reliable good results regarding cutting quality and processing speed, wherein an ellipticity of the beam profile of 2.18 is used, i.e. the ratio of the length of the major axes to the length of the minor axis is 2.18:1. Therefore, according to a specific embodiment of the invention, the relation of the length of the major axis to the length of the minor axis of the cross sectional area is at least 2:1, particularly is in the range of 2:1 to 3:1.

With respect to suitable processing regarding a specific material to be processed, laser parameters particularly are adapted to the type of material. As to an embodiment of the invention, the properties of the laser pulses, in particular the lengths of the main extension axes (e.g. the ellipticity of a Gaussian laser beam profile), pulse repetition rate, pulse durations and/or pulse energies, are adjusted regarding the properties of the material to be processed, in particular regarding a chemical composition and/or a thickness of the material, so that each laser pulse effects a respective major micro-crack with designated lateral length and/or with designated extension in a direction normal to the focal plane, in particular through the entire material.

By providing such individually adapted laser pulses, major micro-cracks with defined lengths can be produced in the material and processing, e.g. cutting, of the material can be performed in a more reliable and optimised way.

According to a specific arrangement of the invention, a single laser pulse of the series of laser pulses, which is directed to the material, effects a major micro-crack with a lateral length of at least 3 µm, particularly at least 10 µm, particularly wherein the single laser pulse comprises a pulse energy of about 40 µJ, a pulse duration in the femtosecond order and the material is transparent or semi-transparent, in particular is made of strengthened (visually transparent) glass, unstrengthened glass or sapphire, e.g. a glass sheet used for displays of mobile phones.

According to a further arrangement of the invention, a single laser pulse of the series of laser pulses, which is directed to the material, causes a micro-crack with an extension as to the direction normal to the surface of the material in a range of 10 to 50 µm, particularly in a range of 10 to 30 µm.

Concerning material processing is in form of cutting the material, such cutting of the material—according to the invention—is performed by inducing successive major micro-cracks along the processing path in adjoining manner, wherein a cutting edge is defined by a course of the successive major micro-cracks in the material.

Particularly, the cutting of the material is performed with a lateral cutting speed regarding the surface of the material in a range of 0.2 to 10 m/s, in particular 0.2-3 m/s, the cutting speed depends at least on the extent of the main axis (i.e. ratio of main and minor extension axis) of the cross sectional area, particularly on the ratio of the lengths of the major axis and the minor axis of the cross sectional area, on the lateral (and/or normal) length of the effected micro-cracks (microdefects), on the pulse energy, on the pulse duration and on a pulse repetition rate. The higher the pulse energies the bigger the effected major micro-cracks may be and the lesser the number of laser pulses to be emitted for cutting along the path is. Additionally, if the pulse repetition rate is increased the cutting speed could be increased, as thus the distance of impinging pulses could be maintained anyway.

Concerning the cutting of relatively thick material, the cutting of the material may be performed by repeated emitting of the laser pulses along the processing path, wherein the major micro-cracks effected by firstly directing the laser pulses along the processing path propagate at least in the direction normal to the focal plane when directing the laser pulses along the processing path for a second time or for further times, in particular wherein the position of the focal point is adapted for each directing of the laser pulses along the processing path. By doing so, a defined number of laser pulses (according to the number of repetitions of the processing path) are applied at each processing point and an initially effected micro-crack can be enlarged by each additional pulse applied.

In particular, each such scan is performed at a different distance between the laser system and the material sample for providing the series of pulses to be applied with adapted focal distance. Alternatively, the focal distance is adapted by adjusting respective optical elements. E.g. when scanning the path for the second time the distance is increased so that the focal point of the laser beam no longer is in the region of the second surface (which is turned away from the point of laser emitting) of the material but lies rather "inside" of the sample (closer to the first surface (which faces the point of laser emitting).

As a particular example for such cutting, "Gorilla" Glass (by Corning Inc., USA) of a thickness of about 0.55 mm can precisely and reliably be cut with following cutting parameters. The ultra-short laser pulses comprise an elliptical shape with an ellipticity of about 2.18. The pulse energy is 34 µJ and the pulses are emitted with a frequency (repetition rate) of 3.3 kHz. Thus, a scanning speed of about 100 mm/s is reached, wherein the cutting path is to be processed for four times and thus an effective cutting speed of 25 mm/s results. Such cutting is performed using an average laser power of 140 mW. By increasing the power to 8 W, and increasing repetition rate to 200 kHz, a cutting speed of 1.5 m/s could be reached.

For a cutting process as exemplarily outlined above, preferably bursts of laser pulses (multiple laser pulses successively applied at one processing point instead of one single pulse) are used in order to provide larger micro-cracks with each scan.

Thus, with view to optimised (fast and precise) material processing—according to the invention—a burst of laser pulses with a defined burst energy (i.e. the sum of pulses of the burst comprises a defined total burst energy) can be generated, the burst of laser pulses being directed at a designated point of the material, particularly at a processing point, wherein a defined inducement and propagation of a respective micro-crack in the material is provided, in particular wherein the burst energy is of at least 10 µJ.

In particular, the laser pulses of the burst are generated with a pulse-to-pulse time lag in a range of 1 to 100 ns, in particular in a range of 10 to 20 ns. Such time lag is preferably chosen in dependency on a stress relaxation time of the material. I.e. if a material with differing relaxation properties is to be processed, the pulse-to-pulse time lag may be adapted accordingly.

As a big advantage, such a burst may cause a crack in the material with an extension as to the direction normal to the surface of the material in a range of 10 to 150 µm, particularly in a range of 40 to 100 µm. Of course, the size of the effected crack depends on the used material and the laser configuration.

According to a specific embodiment of the invention the laser pulses of the burst are—additionally or alternatively—generated comprising a defined power profile. The power profile is defined by an exponential decay of pulse energies of the pulses of the laser burst (i.e. pulses within the burst), in particular wherein the energy of an initial burst pulse is in a range of 15% to 30%, in particular in a range of 20% to 25%, of the burst energy, or an exponential increase of pulse energies of the pulses of the laser burst, or constant pulse energies within the burst.

A burst of above may comprise at least five sub-pulses, which are generated with defined pulse-to-pulse time lag, wherein the time lag may vary or be constant for all pulses. The first emitted pulse of the sub-pulses may comprise about 23% of the entire burst energy and successive pulses may comprise successively decreasing energies.

Alternatively or additionally, the laser pulses of the burst are generated with a defined pulse duration profile. The duration profile can be defined by a pulse-to-pulse increase or decrease of pulse durations (pulse lengths) of the pulses of the laser burst or can be defined by both a pulse-to-pulse increase and decrease of pulse durations during one burst of laser pulses. Such increase and/or decrease can be provided with particular increasing and decreasing rates. Furthermore, the pulse durations (and energies) can be adjusted so that pulse energies of pulses in the burst are not changing due to change of pulse durations. Thus, particular processing parameters can be realised which e.g. require quite constant pulse energies but show improved results when applying increasing and/or decreasing pulse durations over one burst.

For example, an increasing pulse duration of a 14-pulses burst (a burst comprising fourteen sub-pulses) starting at 350 fs and increasing up to 2.5 ps leads to much better quality in terms of cross-sectional surface roughness. Surface roughness here relates to the cut face (cut surface) being generated throughout the material processed with the burst.

Regarding the method according to the invention in general, the laser pulses may particularly be directed (emitted) so that the centroid of the cross sectional area of each laser pulse is located on the surface or inside of the material depending on the designated processing point, in particular wherein the laser pulses are directed so that the centroid of each cross sectional area lies on the processing path or corresponds to the respective processing point.

According to an embodiment of the invention, a compensation plate is provided at the first surface of the material (the surface facing the laser source), wherein the compensation plate comprises defined thickness and light transmitting (or absorbing) properties and the laser pulses pass the compensation plate prior to reaching the material, in particular wherein the light transmitting properties, in particular a refractive index, correspond to those of the material to be processed. Thus, quality of laser processing with elongated or elliptical laser pulses can further be improved e.g. due to the ability of generating precise cracks close to the surface providing cleaving in more precise and reliable manner.

The compensation plate may directly be put on the material, i.e. having contact with the material, or a defined gap (e.g. filled with air or a particular processing medium) between the compensation plate and the material may be provided.

The invention also relates to a laser system for processing of material, in particular transparent or semi-transparent material regarding a wavelength of the laser (in sense of the used laser wavelength), in particular fragile material. The laser system comprises a laser source for generating a series of ultra-short laser pulses with defined beam profile, in particular with pulse durations of less than 1 ns (or <100 ps), in particular pico- or femtosecond laser pulses, and a beam defining unit for directing each laser pulse to the material with defined reference to a respectively assigned processing point of a processing path and for focussing each laser pulse so that respective focal points of the focussed laser pulses comprise pre-defined spatial relations to a first surface of the material (e.g. focussing each laser pulse so that respective focal points of the focussed laser pulses lie on a first surface of the material or between the first and an opposite second surface of the material). Each respectively focussed laser pulse which is directed to the material causes (effects) a respective micro-crack within the material.

According to the invention, the laser source is designed in a manner such that each laser pulse is shapeable regarding its beam profile so that a cross sectional area, which is defined by a cross section of the laser pulse in its focal point orthogonal to its propagation direction, is of particular shape (i.e. the beam profile is of e.g. elliptical, shape) and has a main extension axis that is of significantly greater extent than its minor extension axis. Thereby, one major micro-crack is effected by each laser pulse, the major micro-crack having a lateral extension basically oriented according to the direction of the main extension axis of the cross sectional area of the respective pulse in the focal point. Furthermore, the system provides a processing function which is designed to control the beam defining unit, and particularly the laser source, in a manner such that each laser pulse is emittable so that the orientation of its main extension axis in the focal point corresponds to a pre-defined orientation relative to an orientation of a respective tangent to the processing path at the assigned processing point.

The laser system particularly comprises a controlling unit for controlling the defining unit and the laser source according to the above features of beam shaping and placement of laser pulses.

According to particular embodiments of the laser system, the processing function is designed in a manner such that an above-described method is performed on execution of the processing function.

In particular, the laser system comprises a table which is designed to be movable in at least two directions (x- and y-direction) relative to the laser source and/or to the beam defining unit, the table providing desired displacement of a sample to be processed, in particular wherein the table is moveable so that the laser pulses are directed to the material with defined reference to the respective processing points.

Moreover, the invention relates to a computer programme product having computer-executable instructions for controlling and/or respectively executing an above-described method, in particular when run on a laser system of above. I.e. the computer program is preferably adapted to control a suitable laser system so that non-circular laser pulses are emitted according to the described method.

BRIEF DESCRIPTION OF THE DRAWINGS

The method and the devices according to the invention are described or explained in more detail below, purely by way of example, with reference to working examples shown schematically in the drawings. Specifically.

FIGS. 3a-b show laser emitting units for emission of femtosecond laser pulses with defined beam profile on a material to be processed according to the invention;

FIGS. 4a-b show schematic representations of laser cutting of curvilinear structures according to the invention;

FIGS. 5a-e show the dependency of the lateral size on the number of emitted elliptical pulses according to the invention;

DETAILED DESCRIPTION

Figure 1:
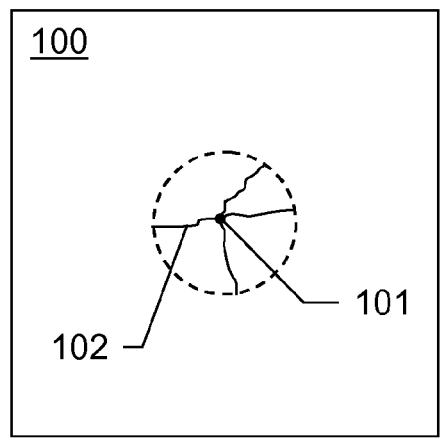
FIG. 1 shows a cross cut through a sample processed with a circular laser pulse as known from prior art.
Figure 2:
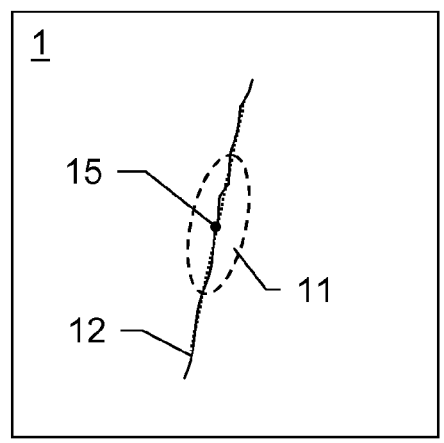
FIG. 2 shows a cross cut through a transparent material processed with laser pulses of elliptical beam profiles according to the invention.

FIG. 2 shows a cross cut through a transparent material 1, e.g. chemically strengthened glass like "Xensation" Aluminosilicate Glass (by Schott AG, Germany) or "Gorilla" Glass (by Corning Inc., USA), wherein an ultra-short laser pulse with an elliptical beam profile 11a, i.e. the shape of the cross sectional 11 of the laser pulse is elliptical, impinges orthogonally on the focal plane within the material 1. As an effect of the energy brought into the material 1 by the laser pulse in defined manner regarding the beam profile, particularly regarding pulse duration and/or pulse energy, one single major elongated micro-defect 12 (micro-crack 12) is caused in the material 1.

Alternatively, the material to be processed is formed by a conductive and transparent oxide film which is used with solar cells or flat panel displays, e.g. an oxide film of ZnO with defined thickness.

As can be seen from FIG. 2, the lateral extension of the micro-crack 12 is significantly greater than the length of the main extension axis (here: major axis) of the cross sectional area 11. Such micro-crack 12 occurs by applying an ultra-short laser pulse with a suitable non-circular, elongated beam profile, e.g. elliptical beam profile, in sense of the present invention, particularly by applying more than one pulse at one single point on the material 1. The lateral length relates to a length of the micro-crack 12 in a direction basically parallel to a focal plane.

It is to be understood that a micro-crack caused by application of a laser pulse with a (e.g. elliptical) beam profile with a main extension axis longer than its minor extension axis according to the invention in the end is well defined, particularly regarding its size, due to an interaction of material and laser properties.

In context of above embodiments of the invention, the size of the cross sectional area of the laser beam at the focal point may be defined by a distance to the centre of the laser beam (channel 15) which e.g. corresponds to a decrease of the laser peak power to $1/e^2$ of that power (particularly for Gaussian beam profiles).

FIG. 3a shows a laser emitting unit 20 for emission of ultra-short (e.g. femtosecond, particularly <600 fs) laser pulses 22 with defined beam profile according to the invention. The unit 20 is designed so that an orientation of an emitted laser beam 21 can be varied in defined manner. Thus, the beam 21 can be moved over a surface of a substrate 1 to be processed according to a defined pattern, particularly along a defined processing or cutting path. For providing such movement of the laser beam the emitting unit 20 e.g. comprises a scanning head.

Moreover, the emitting unit 20 provides the laser beam 20 with a beam shape having a cross sectional area which is defined by a cross section through the laser beam 20 orthogonal to its propagation direction in the focal point of particular non-circular shape, wherein a length of an axis corresponding to a main extension of that shape is greater than a length of a different (orthogonal) axis corresponding to a minor extension of the desired shape. By moving the laser beam over the surface with defined processing speed and emitting such non-circular laser pulses 22 with a predefined pulse repetition rate, a number of the laser pulses 22 can be applied on the surface, wherein the pulses 22 impinge with defined lateral distance relative to each other on the surface.

Alternatively, as shown in FIG. 3b, the laser beam 21 is emitted with constant direction from the laser source 20, wherein a table 19, which carries the substrate 1, is provided and the table 19 is movable in x- and y-directions and/or rotatable relative to the laser source 20. Thus, processing according to a given processing path is enabled by correspondingly moving the sample 1 (and thus defining the scanning speed) while emitting laser pulses with defined repetition frequency and orientation of the beam profile. Particularly, the distance between the laser-emitting-point and the table 19 is adjustable by either moving the laser source 20 or the table 19 (or both) along the z-axis.

Particularly, a combination of moving the laser beam 21 and moving the sample 1 could be applied.

The repetition rate and the scanning speed preferably are adapted so that the distance between two successive laser pulses 22 on the surface (i.e. the distance between the centres of these pulses on the surface) or in the focal plane, which is located between the upper and the bottom surface of the substrate 1, corresponds to an average length of the lengths of the major micro-cracks in the material (transparent or semi-transparent materials like types of glass), which are effected by these laser pulses.

The length of a major micro-crack, which is caused by such a laser pulse, here basically is of about 5-10 times the length of the respective main axis of the cross sectional area—of the elongated cross sections of the pulses—(for better illustration, the laser spots here are illustrated in oversized manner compared to caused micro-cracks), wherein the cross sectional area is defined by the full width half maximum (FWHM) value with respect to the intensity of the laser pulse at the beam centre (of course, the cross sectional area may be defined based on other approaches known from prior art which allow to define the extend of the beam profile). The length of an effected major micro-crack depends on several factors like pulse energy, pulse duration, number of applied pulses at one identical point on the material and material properties.

The length of a major micro-crack basically corresponds to a multiple of the length of the respective main extension axis. The caused major micro-cracks by such an emitted series of laser pulses can be applied contiguous so that there is no space in between the respectively effected major micro-cracks (on the surface of the material) by placing the laser spots with respective (corresponding to the ratio of the lengths of the major micro-cracks and the main extension axes) distance. By use of such a processing approach a continuous cutting of the material is provided, wherein a respective cutting edge is defined by the propagation of the crack with each emitted laser pulse 22.

Particularly, depending on the material to be processed (particularly to be cut) the laser pulses 22 may be placed with a defined space between their cross sectional areas and between the effected major micro-cracks on the surface 2. A precise and well defined fracture of the material along the predefined processing path could still be provide as the material also cracks between the effected major micro-cracks according to a direct connection line from major micro-crack to major micro-crack.

By optimising the distance between two successively impinging pulses 22 on the sample 1, i.e. choosing the largest distance wherein still precise processing or cutting of the material is possible by still meeting demanded requirements, e.g. requirements with view to precision and cutting quality, an optimised (high) processing (cutting) speed can be reached.

As one example, the material may be a kind of visually transparent or semi-transparent (at least with respect to a wavelength-region of about 1040 nm) material (e.g. "Xensation" glass) with a thickness of 0.7 mm and the laser source 20 is operated with an average power of 60 mW, wherein each pulse has energy of 24 µJ and wavelength of 1040 nm, and a repetition rate of 2 kHz. With such configuration a scanning speed of 100 mm/s can be reached by effecting micro-cracks with a lateral length of about 50 µm, wherein the effected micro-cracks propagate through the entire thickness of the material and thus, a clean cut is provided. With increasing the power of the laser 20 up to 8 W or higher, a processing speed of about 10 m/s can be realised. For such processing, preferably, a subset of laser pulses (burst, see e.g. FIG. 6) may be applied for every cutting point particularly if material of greater thickness is to be cut.

FIG. 4a shows a schematic representation of laser cutting of a curvilinear structure according to the invention. A series of laser pulses 22 is applied on the material 1 along a designated curvilinear processing path 25 (as the pulses of the series of laser pulses comprise identical properties except of the orientations of their cross sectional areas, only one of the pulses 22 is referenced by number in place of the rest of the shown pulses). The laser pulses 22 are set so that a defined distance between the defined cross sectional areas of each pulse 22 is present. The cross sectional area may be defined by a distance to the beam centre at a peak power decrease to $1/e^2$ of the peak power.

Here, each pulse 22 causes a micro-crack in the material 1 the extension of which (regarding the lateral length of the crack) is larger than the length of the major axis of the respective cross sectional area at the focal point. A focal plane is defined between a first 2 (facing the laser source) and a second 3 surface (opposite to the first surface 2) of the material 1, wherein the laser pulses 22 are emitted with respective focal points which all lie in such common focal plane.

As shown in the example according to FIG. 4a, each pulse 22 generates a kind of channel 23 throughout the entire material 1 in z-direction. Of course, it is to be understood that it at least depends on the thickness of the material 1 if the channel 23 penetrates the entire material 1. The laser pulses 22 impinge according to a direction orthogonal to the first surface 2 of the material 1 (i.e. in z-direction).

FIG. 4b shows a schematic representation of a top view on the material (first surface 2) as processed similar to as shown in FIG. 4a. The pulses 22 are applied with such defined relative distance that the generated major micro-cracks 24 basically engage into each other and that one continuous edge is built by the generated major micro-cracks 24 thereby.

According to the invention, by a rotation of the elliptical beam the orientations of the major micro-defects 24 (cracks) follow the required processing direction. For that, the orientations of the major axes of the elliptical cross sections (=main extension axes) of the laser pulses 22 are adapted (changed) for to provide a direction of these axes parallel to respective tangents to the processing path 25 or to provide these axes to even be coaxial with such tangents. In other words, the major axis of each respective laser pulse 22 is set so that it is at least parallel to a tangent to the processing path 25 in a respective processing point 26 of the path 25, wherein each laser pulse 22 is assigned to a defined processing point 26.

Thus, according to the invention, any contour can be cut out of the material 1 by using the principle of rotation of the beam profile according to the course of the processing path 25. The cutting edge emerges from the series of induced major micro-cracks 24, wherein laser parameters (e.g. pulse energy, repetition rate, pulse duration and shape of the laser pulses) and the properties of the material 1 to be processed (e.g. transparency, thickness and hardness) define the cutting quality and the cutting speed.

For instance, in case the material 1 to be cut is thicker than the length of the major micro-crack which is effected in the material 1 along the z-direction by application of one single laser pulse 22, more than one laser pulse 22 can be emitted for each processing point 26 or the pulse energy can be increased in order to provide a micro-crack 24 which penetrates through the whole material 1. This can be done by repeated scanning of the same processing path and/or by applying a laser burst for each processing point.

According to a specific embodiment of the invention, a sub-series of laser pulses 22 (burst, see e.g. FIG. 6) is emitted for each processing point 26 with defined repetition frequency so that a set of laser pulses impinges on a defined point at the material 1 and the micro-crack emerging from that point is enlarged due to the number of burst pulses applied at that point. By that, the micro-crack 22 particularly grows laterally along the surface of the material and/or orthogonally to the surface into the material 1 (z-direction).

Particularly, the laser pulses 22 are applied so that they impinge on the processing points 26 the pulses are assigned to. As shown here for better clearness, the laser pulses 22 are applied with defined offset to the path 25 and to respective processing points 26 along the path 25.

The laser properties can be adapted while cutting a contour along the processing path 25. For regions of the processing path 25 which comprise basically linear cutting parts higher pulse energy could be used for effecting micro-cracks with greater lateral lengths, wherein the pulse energy could be reduced when cutting along a curve for providing micro-cracks with smaller size and thus to more precisely generate a curvilinear contour there. Correspondingly, the cutting speed and/or the pulse repetition rate would be adapted as well.

Alternatively or additionally, the pulses may be emitted along the defined processing path so that a defined and basically constant amount of energy is brought into the material per unit of length of the processing path or per unit of area (or volume) of the material.

Concerning the lateral size of the micro-defects 24 generated by laser pulses in context of the number of pulses applied at one single processing point, FIGS. 5a-e show the dependency of that lateral size on the number of emitted pulses according to the invention. Thereby, the pulses are of pulse durations in the femtosecond region and are applied with a time lag between two successive pulses (burst frequency) of about 13 ns. The processed material is formed by a chemically strengthened glass.

FIG. 5a schematically illustrates the effected major micro-crack 24 on application of one single pulse. The length of that micro-crack 24 particularly is about 19 μm. FIG. 5b shows the caused micro-defect 24 with impinging of two pulses at the same point on the material, wherein the length of the micro-defect increases by about 70%, particularly to up to approximately 32 μm. When applying three pulses on one single point on the same material, the size of the micro-crack 24 effected thereby would be about 236% of the size of the micro-crack by one single pulse (about 45 μm) as shown in FIG. 5c. The emitting of four pulses leads to a micro-crack size of about 278% of the initial micro-crack (about 53 μm) as shown in FIG. 5d and the application of more than four pulses, i.e. of multiple pulses, would effect a micro-crack 24—according to the shown example—with a length of at least 56 μm as illustrated in FIG. 5e.

Concerning the burst generation of above and such bursts in context of the present invention in general, it is to be understood that the total energy brought into one single (processing) point of the material does not depend on the number of applied pulses but is the same for e.g. three and five generated burst pulses. With other words, e.g. the pulse energy of the single pulse according to FIG. 5a corresponds to the sum of pulse energies of the two pulses applied in context of FIG. 5b.

Regarding the axial size (z-direction) of the micro-cracks caused by the above use of a burst of pulses, e.g. the axial length of a micro-crack increases by application of four pulses by a factor of about "3" compared with the axial length of a micro-crack caused by one single pulse.

Therefore, the use of a burst of laser pulses leads to a wider range of material to be processable (i.e. which can be cut precisely) with the method according to the invention, particularly regarding the possible thicknesses of the material. Furthermore, as the lateral micro-crack size also increases distinctly, a higher cutting speed could be reached as well.

Moreover, concerning the use of a burst mode according to the invention, the properties of the pulses within one burst particularly are adapted according to the kind (properties) of material to be processed. Preferably, the time period from pulse to pulse (time lag between two successive pulses) is set so that it basically corresponds to or is smaller than the stress relaxation time of the material. This is because the micro-defects in the material emerge by inducing stress propagation (by the applied laser pulse), wherein the stress is caused by thermal impact at the point of laser excitation. The time between the pulses of the burst thus should be equal or smaller than the respective stress relaxation time of the material. E.g. stress relaxation time of chemical strengthened glass is in the region of about 10-20 ns and thus the pulses of the burst can be applied with a time lag between two successive pulses of about 13 ns.

Figure 6:
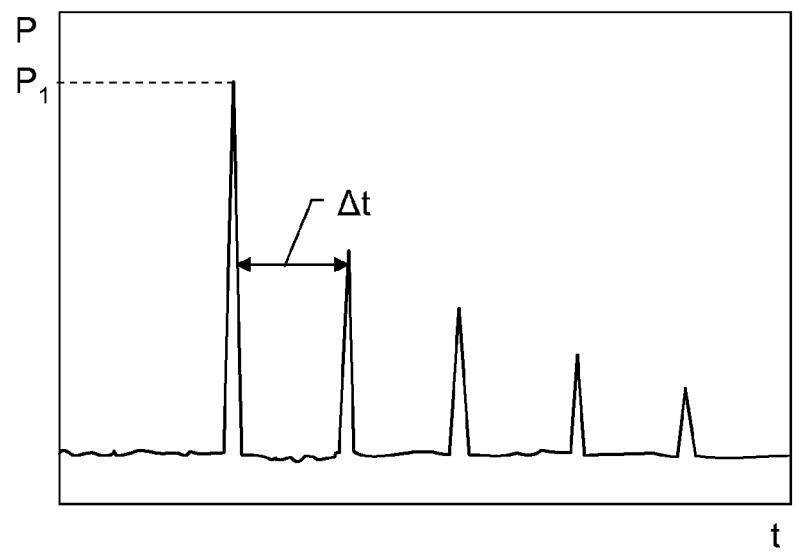
FIG. 6 shows an embodiment according to the invention of a power profile of a burst of laser pulses.

FIG. 6 shows an embodiment of a power profile of a burst of laser pulses being applied for processing of material in context of the present invention. Here, five laser pulses are generated within the respective burst, wherein the number of laser pulses within the burst can vary as to processing requirements. The pulses within the burst are generated with a defined pulse-to-pulse time delay (lag) Δt, which e.g. is of about 13 ns. Moreover, the initial pulse of the burst comprises a particular pulse power $P_1$ (and respective pulse energy E), wherein successive pulses in the burst are generated comprising successively decreasing pulse energies.

As shown here, the energy from pulse to pulse decreases exponentially. Such exponential decay may—according to a specific embodiment—be defined by the function $$E = E_1 \cdot e^{\left(\frac{-t}{\tau}\right)},$$

in particular wherein τ=50 ns.

Figure 7A:
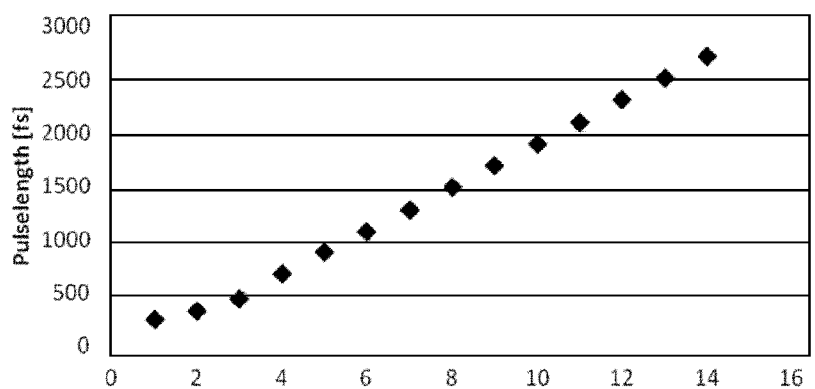
FIG. 7a-c show possible variations of pulse lengths of laser pulses of a burst of laser pulses according to the invention.
Figure 7B:
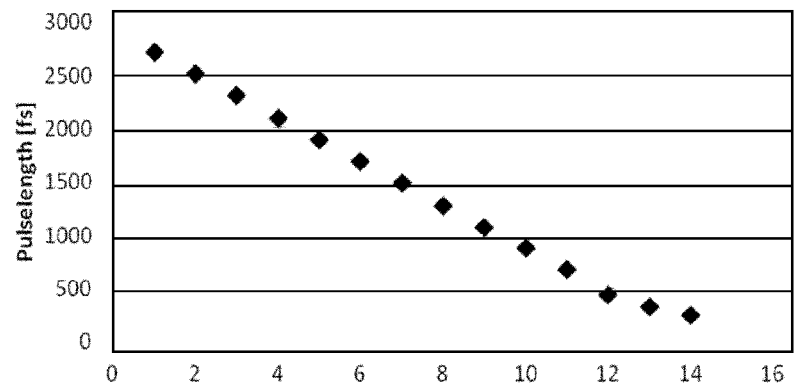
Figure 7C:
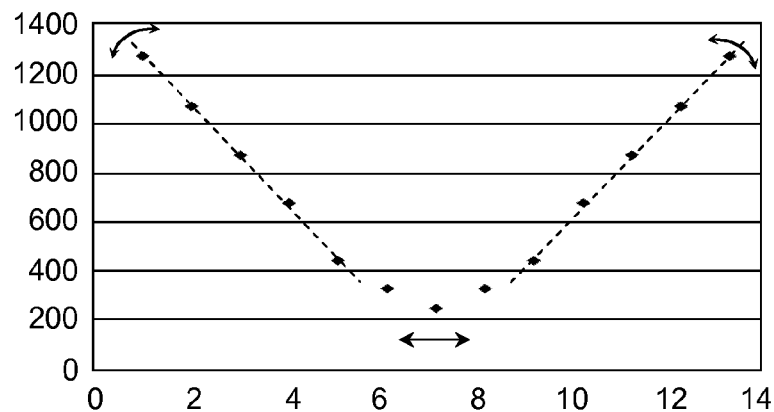

FIGS. 7a-c show possible variations of pulse lengths of laser pulses of a burst of laser pulses. FIG. 7a shows an increase of respective pulse durations starting at about 200-300 fs (femtoseconds) of duration for a first burst pulse and ending with a duration of the last laser pulse of the burst of about 2700 fs. The burst comprises 14 sub-pulses.

FIG. 7b shows a change of pulse durations in the burst to the contrary, i.e. starting with long durations of about 2700 fs and ending the burst with pulses in the region of 500-200 fs.

As described above a combination of decreasing and increasing durations (or vice versa) of burst laser pulses is in the scope of the present invention. FIG. 7c shows such adjustment of pulse durations of one burst. First six pulses are designed to have shorter durations from pulse to pulse resulting in a minimum of pulse length (here: about 250 fs), wherein the durations for successive (six) pulses increase again. As depicted, the rate of duration decrease or increase (slope of dashed lines) can be adjusted according to desired values and the position of the minimum can be varied accordingly. I.e. the number of pulses with decreasing lengths may differ from the number of pulses with increasing durations.

Figure 8:
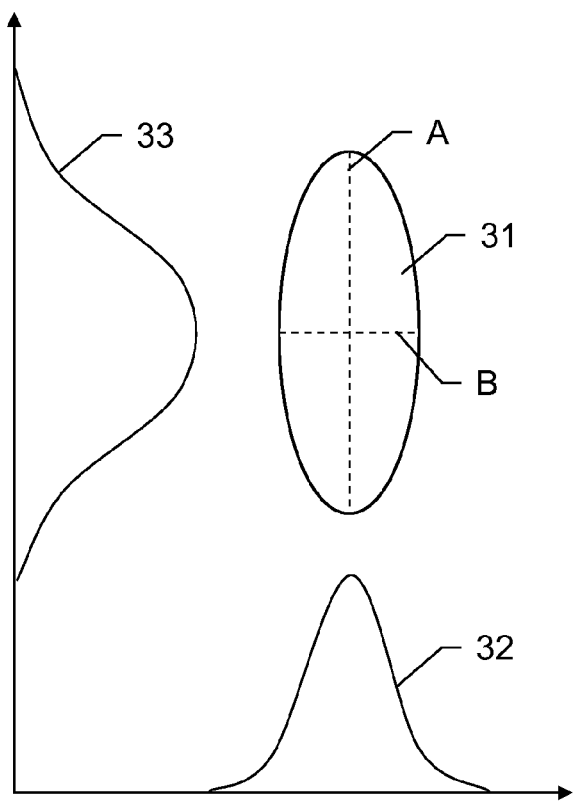
FIG. 8 shows a measurement of a beam profile used with the present invention.

FIG. 8 shows a measurement of an elliptical beam profile used with the present invention. A cross section 31 of a laser beam is shown, which beam is used in form of a laser pulse with defined pulse duration for material processing according to the invention (pulse duration typically is defined based on a FWHM value of the pulse). The beam profile, i.e. the cross sectional area 31, is of elliptical shape with a major axis A and a minor axis B, wherein the length of the major axis A is about 2.2 times greater than the length of the minor axis B. Such ellipticity provides the creation of defined basically linear defects (herein called "major micro-cracks") in e.g. glassy materials and, generally, in transparent materials.

According to another specific embodiment of the invention (not shown) the ratio between the length of the major axis relative to the length of the minor axis is of about 1.5:1, 2:1, 3:1 or even >3:1. The ratio between the major axis and the minor axis is preferably chosen as to the material to be processed and the optimum regarding the emerging micro-crack size and cutting speed.

Furthermore, the intensity distribution of the beam profile along the major A and the minor B axis as measured with such an elliptical beam is shown. The curve 32 depicts the intensity distribution of the laser radiation in the course of the minor axis B and the curve 33 depicts the intensity distribution of the laser radiation in the course of the major axis A. As can clearly be seen, the distributions 32,33 significantly differ from each other with view to their widths (e.g. full widths at half heights), which is a measure for the ellipticity of the beam profile of a respective laser pulse.

In context of FIG. 8 and of other representations of cross sections and beam profiles throughout the present application, it is to be understood that a cross section of preferably a Gaussian laser beam as shown here is only a schematic representation of the real intensity distribution over the entire laser beam and that the shape of a laser pulse is depicted by a border line along a defined peak power decrease with respect to the maximum value in the centre of the beam cross section. Particularly, the full width at half height/maximum (FWHH) value or a decrease to $1/e^2$ of the peak power is used for illustrating the shapes (and size) of laser pulses.

Figure 9:
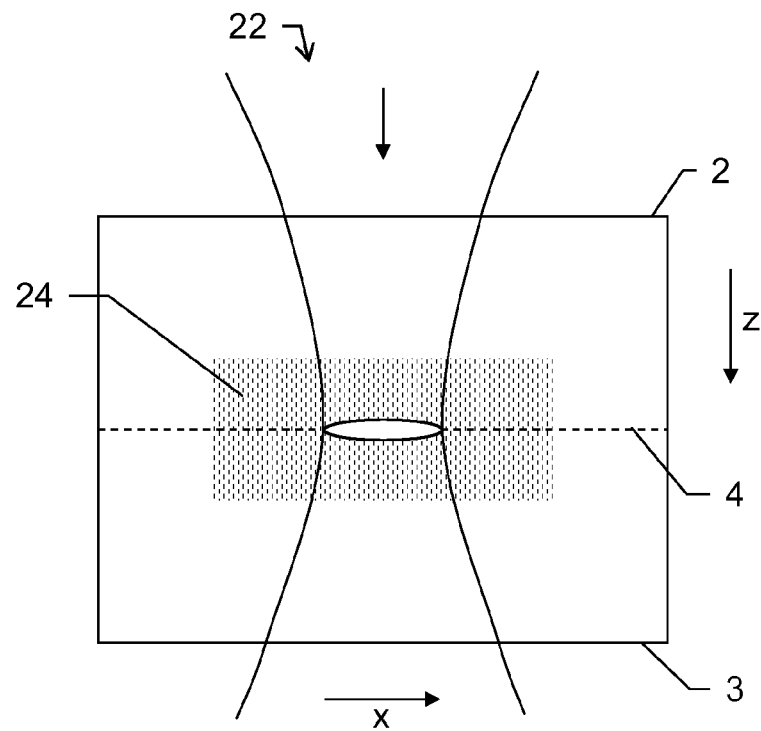
FIG. 9 shows an interaction of an invention-like shaped laser pulse with a transparent material and the major crack effected thereby.

FIG. 9 shows an interaction between a transparent material to be processed and an ultra-short laser pulse 22 with a cross sectional area in its focal point, the focal plane 4 respectively, of elliptical shape. The laser pulse 22 is directed orthogonally to the first surface 2 of the transparent material, i.e. that surface which faces the point of laser emitting, transmits the first surface 2 and interacts with the material basically around the focal plane 4. Due to the high pulse energy (e.g. as discussed above), the ultra-short pulse duration of less than 100 ps and the ellipticity of the beam profile of at least 2:1 a major micro-crack 24 is effected within the material.

As can be seen from the figure, the lateral extension of the micro-crack 24, i.e. an extension at least parallel to the first surface 2 or the focal plane 4, substantially extends the beam diameter with respect to its major axis (in x-direction). Furthermore, the major micro-crack 24 extends in z-direction, but basically is oriented in x-direction.

Figure 10:
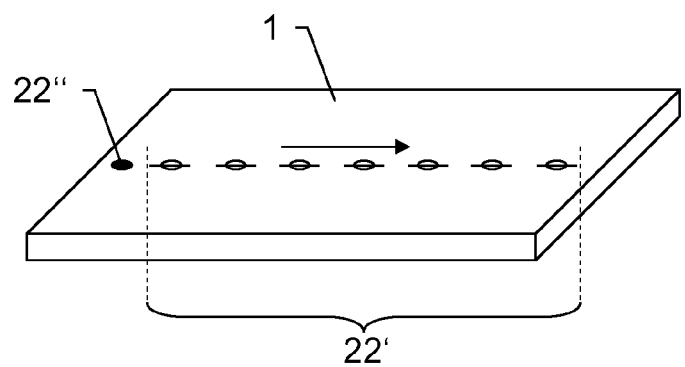
FIG. 10 shows a specific method of laser cutting of transparent material according to the invention ("kick method")

FIG. 10 shows a specific method of laser cutting of transparent material, like chemically strengthen glass, according to the invention ("kick method"). A first series of elliptical laser pulses 22' is emitted to the material 1 along a defined, in particular curvilinear (not shown here), processing path, wherein the pulses are emitted so that effected major micro-cracks have significant distances between each other and thus, the fracture of the material does not occur after having processed the first series of pulses 22'.

For initiating the fracture of the material 1 at least one further laser pulse 22'' is directed at one of the ends of or at a defined point along the processed processing path and initiates fracture of the material 1. The pulse is particularly emitted so that at least one of the already caused major micro-cracks is enlarged by the additional pulse 22'' and thus pushes the break of the material 1 along the processing path. Alternatively or additionally, the further laser pulse 22'' is generated with use of different laser parameters, e.g. the further pulse 22'' comprises higher pulse energy or a different ratio of its main extension axis relative to its minor extension axis.

In other words, in general, after having directed a series of laser pulses to the material, at least one further initiating laser pulse 22'' is emitted at the material 1 with defined reference to the processing path so that an interaction of the initiating laser pulse 22'' with the material 1 initiates a fracture of the material 1 along the processing path.

Figure 11A:
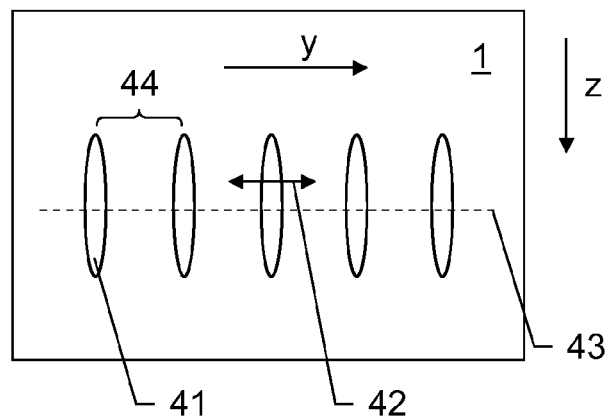
FIGS. 11a-b show a cross-cut through laser-processed material and corresponding roughness analyses.

FIG. 11a shows a cross cut through a material 1 being processed according to the method of the present invention. The processing direction is in y-direction. As can be seen, modified areas 41 (only one of which is referenced as to simplification reasons) within the material 1 are generated with each laser pulse interacting with the material 1. Moreover, a length 42 of a respective crack for each modified area 41 is depicted. The length 42 of such related cracks are significantly greater than the width of the modified areas 41 (basically corresponding to the main extension axes of the cross sectional areas of the laser pulses) in y-direction.

Figure 11B:
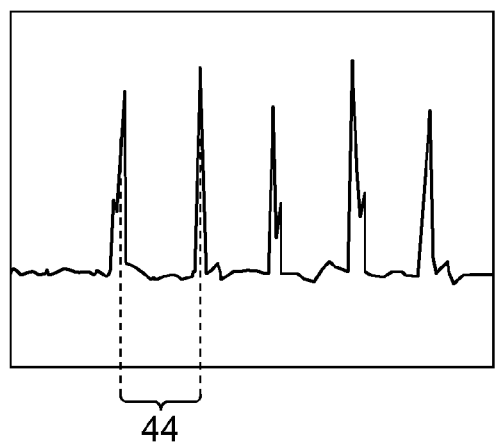

FIG. 11b shows a topographic measurement (profile) along the line 43, i.e. a profile of the material 1 after laser processing in a plane of modification (y-z plane) and the focal plane (x-y plane). Shown is the profile height over the respective position in y-direction. The peaks of the curve represent topographic properties of the modified areas 41. The distance 44 between the peaks of the topographic curve corresponds to the distance 44 between the modified areas (distance between two successive laser pulses). Therefore, roughness mainly increases with each of the modifications 41 but remains comparatively low in regions between such modifications 41.

This means, the larger the distance between the modified areas 44, the better the processing quality, i.e. the lesser the overall roughness, is. By applying the method according to the present invention, a roughness ($R_d$) of <1 μm can be realised with glass substrates as mentioned herein.

Moreover, process robustness can be improved by increasing the distance 44 between the modified areas 41. In case of a small distance between pulses (e.g. 3-5 μm), which is used in other laser processes known from prior art, formation (shape, z-position, etc.) of a next (successive) modified area is influenced by the previous modified area. The process window there is defined e.g. by $D_{min}$~3-5 μm pulse distance where formation of the second modified area already is not influenced by the first modified area and particularly $D_{max}$~4-6 μm at which material can still be cleaved in controlled way. That also limits the laser repetition rate, cutting speed, pulse energy etc. applicable for the process.

In case of enlarged distances between sequential laser pulses (or bursts)—according to the present invention—formation of a second (successive) modified area is independent from (not influenced by) the first modified area. The process window is limited by only a distance $D_{max}$>>6 µm (up to e.g. 50 µm) which depends on the significantly greater lateral crack length which is effected.

Figure 12:
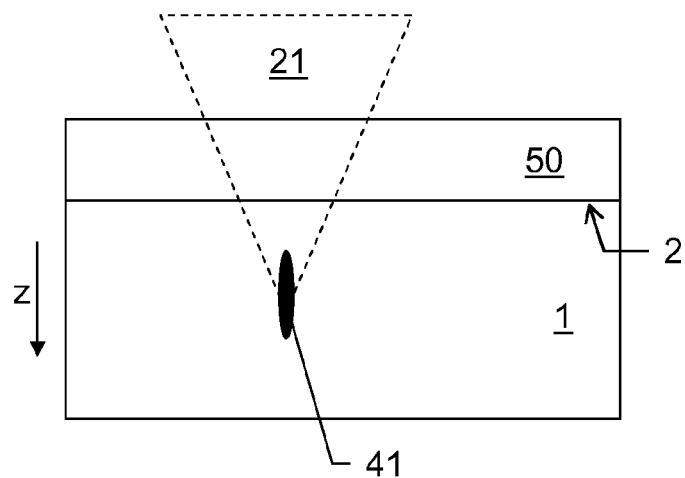
FIG. 12 shows a further embodiment of material processing according to the invention using a compensation plate.

FIG. 12 shows a further embodiment of material processing according to the invention. An additional layer or plate 50 is provided on top of the material 1 to be processed, i.e. on that surface 2 which faces the point of emitting the laser light 21 at the laser system. According to the shown embodiment the (complex) refractive index of the compensation plate 50 ($n_1$) is in the same order as, in particular is the same as, the one of the substrate 1 ($n_2$). Fresnel losses can be reduced when $n_1$ is equal to $n_2$. The light transmitting properties of the compensation plate 50 are preferably chosen to be similar to the substrate. The compensation plate 50 may be transparent or semi-transparent regarding the laser wavelength.

By putting such compensation element 50 onto the material 1 quality of caused major micro-cracks becomes significantly better compared to machining without the compensation plate 50. Moreover, significant improvements can be achieved with view to inducing cracks close to the top surface 2 of substrate 1. For that, of course, matching thickness of the plate 50 and focal length of the laser beam has to be provided, respectively. Besides the advantage that major micro-cracks will have better quality when machining close to the top surface also the cutting straightness can be increased by use of the plate 50.

The compensation plate 50 enables to adjust the modified area 41 within the substrate 1 with respect to its position (in z-direction) and shape.

Therefore, a combination of applying elliptical laser pulses and such compensation plate 50 with a material to be processed (e.g. a glass substrate) results in further improved processing parameters for e.g. improved glass cutting quality.

Figure 13:
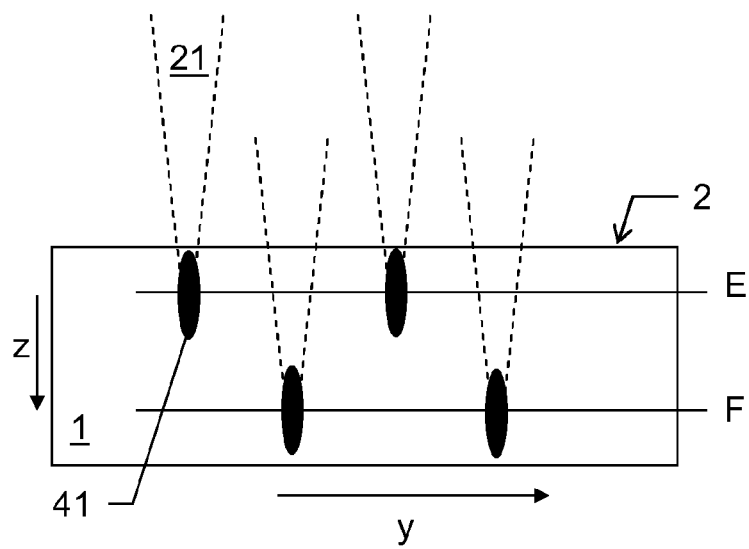
FIG. 13 shows an embodiment of material processing according to the invention using elongated laser pulses and a variation of focal points for successive pulses.

FIG. 13 shows an embodiment of material processing using elongated (e.g. elliptical) laser pulses (with reference to a lateral x- or y-direction) and a variation of focal points for successive pulses. The focal points of respective pulses lie within two focal planes E and F. The change of the location of the focal points in z-direction can be realised from pulse to pulse so that successive pulses are located in different focal planes E or F. Such change is preferably realised using a lens able to provide different foci with high changing frequency.

Generating modified areas 41 and respective centres of cracks with different focal positions in z-direction, that way provides an increase of the effective cutting speed in case crack initiation is required in more than one focal plane E and F, e.g. if the substrate 1 to be processed is of relative great thickness (i.e. processing with creating cracks in only one focal plane is not enough to guarantee sufficient cleaving results). In other words, by applying pulses with different focal levels during one scan in y-direction only one pass of scanning is enough while alternatively—according to prior art—a second pass would be required with machining using fixed focal length.

A lens being arranged for variable adjusting the focal length preferably operates with a frequency in the MHz order which provides to change position of the focus position for every emitted laser pulse.

Figure 14:
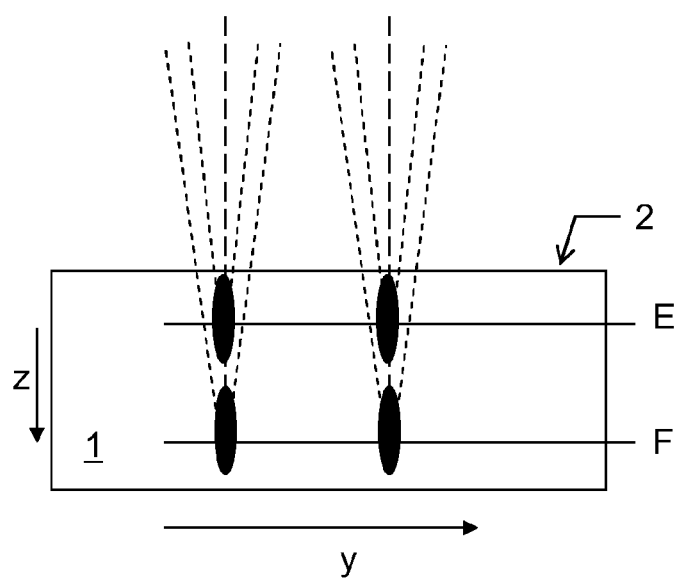
FIG. 14 shows an embodiment of material processing according to the invention using non-circular laser pulses and converging each laser pulse in at least two focal points.

FIG. 14 shows an embodiment of material processing using non-circular (e.g. elliptical) laser pulses (with reference to a lateral x- or y-direction) and converging (focussing) each laser pulse in at least two focal points (focal planes E and F) along its respective emitting direction (here: z-direction). Such forming of two focal points for one laser pulse can be provided by a multi-foci lens.

As a big advantage of such processing two modification areas can be caused with application of only one laser pulse which provides for two cracking-centres in different z-positions and thus enables to realise cutting (cleaving) of glass substrates 1 of comparatively large thickness by one single pass of the laser light along a processing path. A second pass with different focal length can be avoided. Therefore, a (higher) processing speed of significantly higher efficiency can be realised.

Although the invention is illustrated above, partly with reference to some specific embodiments, it must be understood that numerous modifications and combinations of different features of the embodiments can be made and that the different features can be combined with approaches of laser processing of material and/or pulsed laser systems known from prior art.

What is claimed is:

1. Method for processing of material by use of a pulsed laser, the material being transparent or semi-transparent regarding a wavelength of the pulsed laser, the method comprising:
   generating a series of ultra-short laser pulses with pulse durations of less than 1 ns;
   directing each laser pulse to the material with defined reference to a respectively assigned processing point of a processing path;
   focusing each laser pulse so that respective focal points of the focused laser pulses comprise pre-defined spatial relations to a first surface of the material, wherein each emitted laser pulse effects a respective crack within the material;
   shaping each laser pulse regarding its beam profile so that a cross sectional area, which is defined by a cross section of the laser pulse in its focal point orthogonal to its propagation direction, is of a particular shape and has a main extension axis of significantly greater extent than a minor extension axis which is orthogonal to the main extension axis;
   effecting one major micro-crack by each laser pulse, the major micro-crack having a lateral extent basically oriented according to the orientation of the main extension axis of the respective pulse in the focal point and significantly greater than the extent of the respective main extension axis of the cross sectional areas in the focal point, the lateral extent is in a range of 3-30 times the length of the respective main extension axis; and
   emitting each laser pulse so that the orientation of its main extension axis in the focal point corresponds to a pre-defined orientation relative to an orientation of a respective tangent to the processing path at the assigned processing point, wherein a single laser pulse of the series of laser pulses, which is directed to the material, effects the major micro-crack with a lateral length of:
   at least 3 µm; or
   at least 10 µm, wherein the single laser pulse comprises a pulse energy of:
      at least 10 µJ; or
      at least 40 µJ with a pulse duration in the femtosecond order; and
   the material is transparent or semi-transparent and is made of chemically strengthened glass, unstrengthened glass, or sapphire.

2. The method according to claim 1, wherein the series of ultra-short laser pulses are generated with pulse durations of pico- or femtosecond laser pulses.

3. The method according to claim 1, wherein the orientation of the main extension axis of the cross sectional area of each laser pulse is adapted depending on the course of the processing path by a defined rotation of the beam profile around the centroid of the cross sectional area.

4. The method according to claim 1, wherein at least one of the laser pulses is shaped so that its cross sectional area is of elliptical shape and the main extension axis is defined by the major axis of the elliptical cross sectional area, wherein the ratio of the length of the major axis to the length of the minor axis of the cross sectional area is:
at least 1.1:1;
at least 2:1; or
is in the range of 2:1 to 3:1.

5. The method according to claim 1, wherein after directing the series of laser pulses to the material, at least one further initiating laser pulse is emitted at the material with defined reference to the processing path so that an interaction of the initiating laser pulse with the material initiates a fracture of the material along the processing path.

6. The method according to claim 1, further comprising directing the laser pulses so that a lateral distance on the first surface or in a plane relative to the first surface and/or with reference to the focal points between at least two of the laser pulses which are successively emitted corresponds to an average of the lateral lengths of the major micro-cracks effected thereby or is bigger than the average of the lengths of the main extensions and major axes of respective cross sectional areas of these pulses in the focal points, wherein:
respective major micro-cracks are created with a defined spacing in between; or
respective major micro-cracks are adjoining; or
the major micro-crack effected by a first of the successive laser pulses is extended due to the major micro-crack induced by a second of the successive laser pulses.

7. The method according to claim 1, wherein the properties of the laser pulses including the lengths of the main extension axis, pulse repetition rate, pulse durations and/or pulse energies are adjusted regarding the properties of the material to be processed regarding a chemical composition and/or a thickness of the material so that each laser pulse effects a respective major micro-crack with designated lateral length and/or with designated extension in a direction normal to the focal plane through the entire material.

8. The method according to claim 1, wherein cutting of the material is performed by inducing successive major micro-cracks along the processing path in adjoining manner, wherein a cutting edge is defined by a course of the successive major micro-cracks in the material, wherein the cutting of the material is performed with a lateral cutting speed regarding the first surface of the material in a range of 0.2 to 10 m/s, or 0.2-3 m/s, the cutting speed depends at least on the shape of the cross sectional area, on the ratio of lengths of the major axis and the minor axis of the cross sectional area, on the pulse energy, on the pulse duration and on a pulse repetition rate, wherein the cutting of the material is performed by repeated directing of the laser pulses along the processing path, wherein the major micro-cracks effected by firstly directing the laser pulses along the processing path propagate at least in the direction normal to the focal plane when directing the laser pulses along the processing path for a second time or for further times, wherein the position of the focal point is adapted for each directing of the laser pulses along the processing path.

9. Method for processing of material by use of a pulsed laser, the material being transparent or semi-transparent regarding a wavelength of the pulsed laser, the method comprising:
generating a series of ultra-short laser pulses with pulse durations of less than 1 ns;
directing each laser pulse to the material with defined reference to a respectively assigned processing point of a processing path;
focusing each laser pulse so that respective focal points of the focused laser pulses comprise pre-defined spatial relations to a first surface of the material, wherein each emitted laser pulse effects a respective crack within the material;
shaping each laser pulse regarding its beam profile so that a cross sectional area, which is defined by a cross section of the laser pulse in its focal point orthogonal to its propagation direction, is of a particular shape and has a main extension axis of significantly greater extent than a minor extension axis which is orthogonal to the main extension axis;
effecting one major micro-crack by each laser pulse, the major micro-crack having a lateral extent basically oriented according to the orientation of the main extension axis of the respective pulse in the focal point and significantly greater than the extent of the respective main extension axis of the cross sectional areas in the focal point, the lateral extent is in a range of 3-30 times the length of the respective main extension axis;
emitting each laser pulse so that the orientation of its main extension axis in the focal point corresponds to a pre-defined orientation relative to an orientation of a respective tangent to the processing path at the assigned processing point; and
generating a burst of laser pulses with a defined burst energy, the burst of laser pulses being directed at a designated processing point on the material, wherein a defined inducement and propagation of a respective major micro-crack in the material is provided, wherein the burst energy is of at least 10 µJ, wherein the laser pulses of the burst are generated:
with a pulse-to-pulse time lag in a range of 1 to 100 ns, or in a range of 10 to 20 ns, wherein the burst effects the micro-crack in the material with an extension as to the direction normal to the surface of the material in a range of 10 to 150 µm, or in a range of 40 to 100 µm, and/or
comprising a defined power profile, the power profile being defined by:
an exponential decay of pulse energies of the pulses of the laser burst, wherein the energy of an initial burst pulse is in a range of 15% to 30% of the burst energy, or in a range of 20% to 25% of the burst energy; or
an exponential increase of pulse energies of the pulses of the laser burst; or
constant pulse energies with respect to the pulses of the laser burst; and/or
comprising a defined pulse duration profile defined by:
a pulse-to-pulse increase of pulse durations of the pulses of the laser burst; or
a pulse-to-pulse decrease of pulse durations of the pulses of the laser burst decay; or
both a pulse-to-pulse increase and decrease of pulse durations during one burst of laser pulses with defined increasing and decreasing rates.

10. The method according to claim 9, wherein the burst includes at least five pulses of successively decreasing energies.

11. The method according to claim 9, wherein the burst includes pulses of successively increasing duration.

12. The method according to claim 9, wherein the burst includes 14 pulses increasing in duration between 350 femtoseconds and 2.5 picoseconds.

13. The method according to claim 9, wherein time between pulses of the burst are equal or smaller than a stress relaxation time of the material.

14. The method according to claim 13, wherein the stress relaxation time of the material is between about 10-20 nanoseconds.

15. Method for processing of material by use of a pulsed laser, the material being transparent or semi-transparent regarding a wavelength of the pulsed laser, the method comprising:
  generating a series of ultra-short laser pulses with pulse durations of less than 1 ns;
  directing each laser pulse to the material with defined reference to a respectively assigned processing point of a processing path;
  focusing each laser pulse so that respective focal points of the focused laser pulses comprise pre-defined spatial relations to a first surface of the material, wherein each emitted laser pulse effects a respective crack within the material;
  shaping each laser pulse regarding its beam profile so that a cross sectional area, which is defined by a cross section of the laser pulse in its focal point orthogonal to its propagation direction, is of a particular shape and has a main extension axis of significantly greater extent than a minor extension axis which is orthogonal to the main extension axis;
  effecting one major micro-crack by each laser pulse, the major micro-crack having a lateral extent basically oriented according to the orientation of the main extension axis of the respective pulse in the focal point and significantly greater than the extent of the respective main extension axis of the cross sectional areas in the focal point, the lateral extent is in a range of 3-30 times the length of the respective main extension axis;
  emitting each laser pulse so that the orientation of its main extension axis in the focal point corresponds to a pre-defined orientation relative to an orientation of a respective tangent to the processing path at the assigned processing point; and
  directing the laser pulses so that a lateral distance with reference to the focal points between at least two of the laser pulses which are successively emitted is equal to or greater than an average of the lateral lengths of the major micro-cracks effected thereby, wherein:
    the main extension axis of each pulse is between 2 micro-meters and 3 micro-meters, the effected major micro-crack has a lateral length in the range of between 10 micro-meters and 60 micro-meters, and the laser pulses are directed with a distance with reference to the focal points between the at least two of the laser pulses which are successively emitted between 10 micro-meters and 60 micro-meters.

* * * * *